United States Patent [19]

Brandt

[11] Patent Number: 5,261,042
[45] Date of Patent: Nov. 9, 1993

[54] MENU MANAGEMENT SYSTEM

[75] Inventor: Timothy A. Brandt, Boxborough, Mass.

[73] Assignee: Wang Laboratories, Inc., Lowell, Mass.

[21] Appl. No.: 440,419

[22] Filed: Nov. 20, 1989

Related U.S. Application Data

[63] Continuation of Ser. No. 844,909, Mar. 27, 1986, abandoned.

[51] Int. Cl.5 .......................................... G06F 15/403
[52] U.S. Cl. .................................. 395/156; 395/155; 364/DIG. 2; 364/948.22; 364/948.2; 364/948.21
[58] Field of Search .................. 364/900 MS File; 395/156

[56] References Cited

U.S. PATENT DOCUMENTS

| | | | |
|---|---|---|---|
| 4,291,198 | 9/1981 | Anderson et al. | 364/900 |
| 4,403,303 | 6/1983 | Howes et al. | 364/900 |
| 4,429,385 | 1/1984 | Cichelli et al. | 370/92 |
| 4,451,895 | 5/1984 | Sliwkowski | 340/708 |
| 4,454,576 | 6/1984 | McInroy et al. | 364/200 |
| 4,480,308 | 10/1984 | Grafe et al. | 364/200 |
| 4,556,954 | 12/1985 | Advani et al. | 364/900 |
| 4,570,217 | 2/1986 | Allen et al. | 364/188 |
| 4,641,269 | 2/1987 | Japenga et al. | 364/473 |
| 4,679,137 | 7/1987 | Lane et al. | 364/200 |
| 4,723,210 | 2/1988 | Barker et al. | 364/300 |
| 4,730,252 | 3/1988 | Bradshaw | 364/403 |

*Primary Examiner*—Gareth D. Shaw
*Assistant Examiner*—Kakali Chaki
*Attorney, Agent, or Firm*—Kenneth L. Milik

[57] ABSTRACT

A menu management system providing application developers a flexible tool for building a consistent user interface. A menu data base is created and edited using a maintenance module. The menu data base is then used by a menu manager to present displays to the user and accept user selections. The system provides for user selections to be indicated by menu picks, programmable function keys, or by typed commands. The menu manager maintains a list of menus that have been presented to the user and provides four ways that the user can back up through these menus. One of these four ways is a command that causes the menu manager to display for the user a list previous menus, allow the user to select one from the list, and back up directly to the selected menu.

9 Claims, 3 Drawing Sheets

MENU MANAGEMENT SYSTEM

This is a continuation of copending application(s) Ser. No. 06/844,909 filed on Mar. 27, 1986, now abandoned.

FIELD OF THE INVENTION

The present invention relates to mechanisms by which users direct the action of computer-based systems.

BACKGROUND

In efforts to make computer-based systems easier for people to use, various methods of communicating commands to the computer have been developed. With the "command-line" approach, the user types the text of a command. Keys have been added to the keyboard that can be used to issue a command with a single key stroke; the extra keys may be arranged to perform different functions at different times, in which case they are known as programmable function keys (PF keys). Menu-driven systems display lists of commands (also known as menu picks) from which the user can select by moving a cursor to point to the desired menu pick.

Menu systems can be arranged to operate in various ways. For example, the keys can be used in different ways, such as using the arrow keys to move the cursor among the menu picks or using the space and backspace key to move the cursor among the menu picks. If the key usage and display conventions for menus is different when using a computer system for different functions, the user's efficiency will be diminished; in extreme cases, incorrect menu selections may be made.

A menu-driven system may organize its commands in a hierarchy of menus. For example, the top level menu might be used to select among different applications such as word processing, data base management, a message system; if the user selects the message system from the top level menu, then the next level menu is presented with options such as reading, creating, or sending messages; if the user selects message creation, then the next level menu might provide various commands for editing the text of messages. The other options on the top level menu lead to other branches in the menu tree or hierarchy.

Although tree-like structures are typically used, the organization need not be perfectly tree-like. For example, it may be desirable to have the same option appear on menus in separate branches; this would be like two branches with a common sub-branch.

In a menu-driven system that offers a very large repertoire of commands, navigation through the menu system can itself become time consuming. For certain situations, backing up is becoming an increasingly undesirable way of getting back to a previous menu. If one frequently switches between two areas of the menu system that are deep in the menu hierarchy, much time may be spent backing up through menus from one area to a high level menu common to the two areas and then proceeding down through menus to the other area. Unnecessary delay results from the time it takes to present to the user each of the menus through which the user wants to back up and the time it takes the user to check to see if the desired menu has been reached.

One way to address this problem is to provide menu by-pass commands. A mechanism is provided by which the user can enter a code or some command text identifying directly the menu to which the user desires to proceed. In by-passing menus in this way, the user is also giving up the benefit menus provide; this form of menu by-pass is a return to command-line operation with the associated limitation that the user must remember the by-pass commands.

Another type of menu navigation aid is a "menu" key. In response to pressing the menu key, the system switches directly to the top level menu. This key enables a user to proceed directly from any lower level menu directly to a predetermined menu.

SUMMARY OF THE INVENTION

According to the present invention a mechanism is provided to enable a user to proceed directly to a previous menu by selection from a list of previous menus. Mechanisms are provided for maintaining a list of the path of menus through which a user has passed, displaying that list to the user in response to a particular command selection by the user, accepting a selection from the user of one of the menus in the list, and returning the user to the selected menu. The command by which the user activates the menu list display may be arranged to result from selection of a menu pick, pressing a PF key, or typing the text of the command.

BRIEF DESCRIPTION OF THE DRAWING

The invention is pointed out with particularity in the appended claims. The above and other advantages of the invention may be better understood by referring to the following detailed description in conjunction with the drawing, in which:

DETAILED DESCRIPTION OF AN ILLUSTRATIVE EMBODIMENT

TABLE OF CONTENTS

MENU MANAGEMENT SYSTEM
MENU DATA BASE (FIG. 1)
PF KEY AND USER DATA BASES
MAINTENANCE MODULE
MENU MANAGER
MENU PATH
MENU LIST (FIGS. 2 and 3)
MENU MANAGER OPERATION (FIGS. 4 and 5)
SOME VARIATIONS

MENU MANAGEMENT SYSTEM

The present invention is advantageously embodied in a menu management system.

The menu management system includes data bases of information that adapts the system to any particular use. The data bases hold information that defines menus, users, and actions for programmable function keys (PF keys).

The menu management system includes two modules that use these data bases:

(1) a maintenance module, which is used to create and update the data bases; and
(2) a menu manager, which, based on information in the data bases, presents menus to a user, accepts the user's selections, and directs actions to be taken in response to the selections.

The menu management system is a tool that can be used to interconnect a collection of subsystems. It can provide the mechanism by which a user directs the overall operation, in effect, building a single system from the collection of subsystems. For example, an accounting system may include program modules that update the accounting system's data base, produce reports, back up critical files, etc. A menu management system could provide the mechanism by which the user selects which of these program modules should be executed. In addition, the menu management system could be used by an individual program module to obtain selections from the user (e.g., the report program may use the menu management system to display a menu of all report types from which menu the user selects the reports that the user wishes to produce).

Use of a menu management system to obtain user selections has various advantages. Savings in both programming time and program size may be obtained, because the program to display menus and accept user selections need only be written once and is thereafter shared among various programs. A menu management system helps provide consistency in the user interface—e.g., the keyboard always operates the same way when making menu picks.

The illustrative menu management system includes data bases with information defining:

(1) menus (e.g., screen layout, actions for the menu picks),
(2) users (e.g., security classes, passwords), and
(3) PF keys (e.g., actions).

MENU DATA BASE

The menu data base contains the information defining the menus to be displayed by the menu manager. A menu management system may include a plurality of menu data bases; each data base is stored in its own file.

When the menu manager is called, a menu data base file is specified by the caller. Optionally, the caller may also direct the menu manager to display to the user a screen allowing the user to specify the menu data base file to be used.

Each menu data base file can include some information that will apply to all menus included in that data base (i.e., applying to the entire data base file). Each menu data base file will include information for each of the menus which are defined in the file. For each menu, the menu data base file will include information defining each of the menu picks. Thus, a typical menu data base file will contain some information common to all menus, a plurality of menu definitions, and as part of each menu definition a plurality of menu pick definitions.

Figure 1:
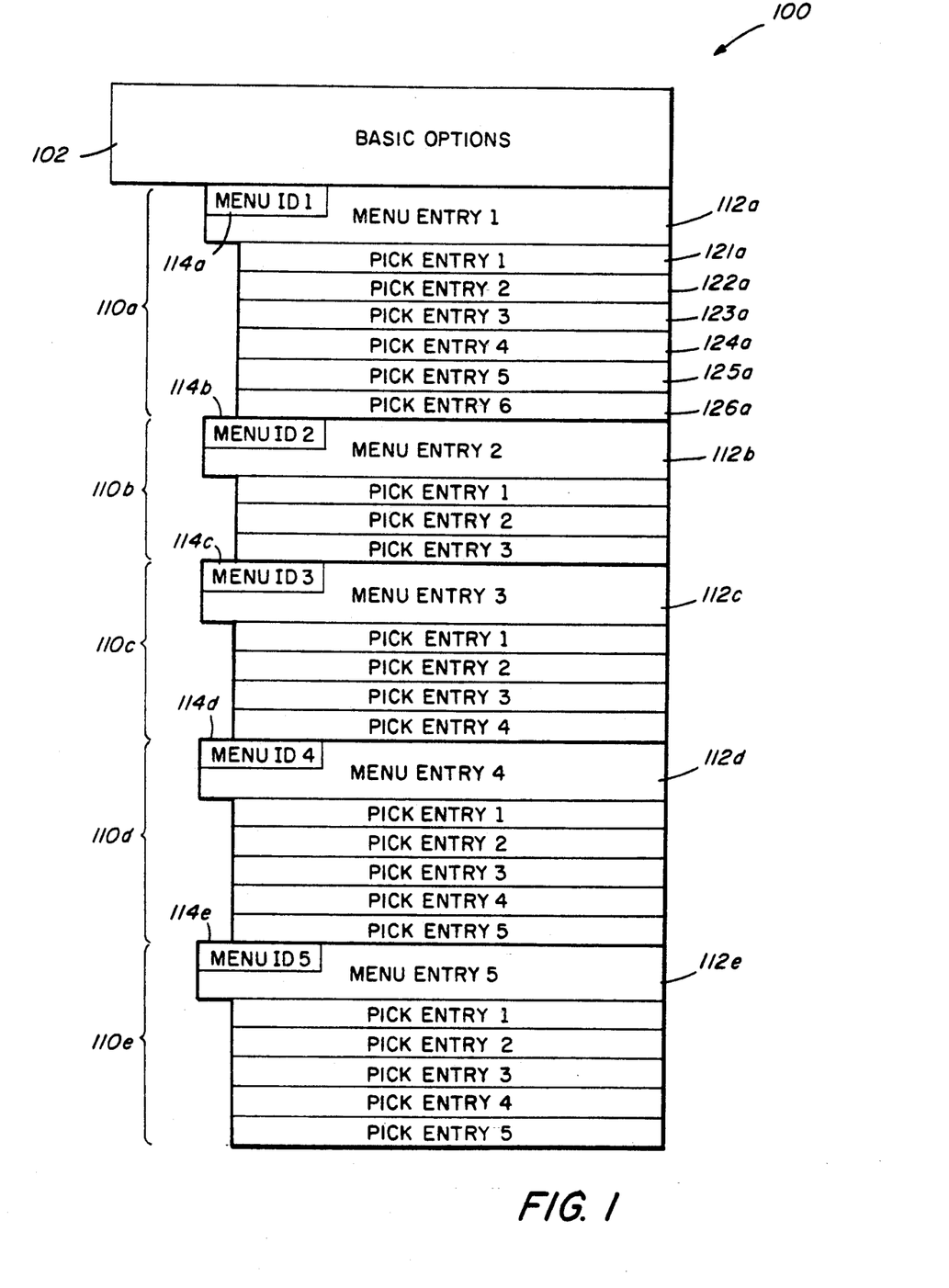
FIG. 1 shows the logical arrangement of some of the major features of a menu data base of an illustrative menu management system embodying the present invention.

FIG. 1 illustrates the structure of a menu data base 100 containing definitions of five menus. (Typical data bases define far more than five menus; only five are shown in this example so as to keep the figure reasonable in size.)

The information common to all of the menus in the data base is stored in a basic options section 102. The information in the basic options section 102 includes the following:

window format-defining aspects of the screen display that will not differ from one menu to the next;
a file-level entry procedure;
a file-level exit procedure;
file-level security information;
identification of a file containing PF key definitions; and
identification of a file containing user definition information.

Following the basic options section 102 is a series of menu entries 110a, 110b, 110c, 110d, 110e. The information in the data base for each menu includes:

a menu identifier 114a, 114b, 114c, 114d, 114e (each menu has a name which is unique within the data base and is used as a key for retrieving the record(s) relating to a particular menu);
a menu title (displayed at the top of the screen when the menu is displayed and used in the below-described display of the menu list);
menu-level security information;
identification of a menu entry procedure;
identification of a menu exit procedure;
timeout information; and
a series of menu pick entries (further described below).

All of these items of information except for the pick entries are stored in a main portion 112a, 112b, 112c, 112d, 112e of each of the menu entries 110a, 110b, 110c, 110d, 110e. Following each main portion is a series of pick entries, which will vary in number from menu to menu. For the first menu in the illustrative menu data base there are six menu pick entries 121a, 122a, 123a, 124a, 125a, 126a.

Each menu pick entry includes:

a pick title to be displayed as part of the menu (this is what the user identifies as the "menu pick");
pick-level security information; and
identification of the action associated with the pick (program, menu, internal function, or keyword).

The action taken when the user selects a menu pick can be one of four types:

program—the program is executed, then the current menu is again displayed for another user selection;
menu—the menu is added to the menu list and becomes the current menu (i.e., the basis for the next user selection);
internal menu manager function (e.g., back up one menu or terminate menu manager processing); or
keyword—the keyword is returned to the calling program (the calling program may choose to call the menu manager again without altering its state, in which case the current menu is displayed again for another user selection).

The menu management system provides for pseudo-pick entries in the menu data base. These cannot be selected by the user; they are not associated with an action. The pseudo-pick entries are used to control the displayed arrangement of menu picks and to display information on the menu screen in addition to the titles of the menu picks that do have associated actions.

Some of the above-listed information items are optional. When not present, the menu manager uses default values.

The pick-level security information controls which menu picks are actually displayed to any particular user. Each user will only see those menu picks of the security classes to which that user is defined to have access. Thus, a menu may be displayed with different sets of picks for different users.

PF KEY AND USER DATA BASES

Other data bases used by the menu management system include data bases of users and of PF key definitions.

A data base of users defines logon information for each user and the security classes available to each user. The security classes determine what menu data base files and data base elements the user can modify (using the maintenance module), and what data base files, menus, and menu picks are available to the user through the menu manager.

A PF key data base defines which action, if any, is bound to each PF key. This set of PF key definitions determines what will happen, if anything, when a user presses a PF key.

MAINTENANCE MODULE

The menu management system includes a maintenance module that is used to create and modify the various data bases used by the menu management system.

MENU MANAGER

Based on the contents of the menu management system data bases and the selections made by the user, the menu manager provides for movement among menus, execution of programs, and the return to a calling program of keywords. The data bases determine what is possible, and the user determines what actually happens.

The menu manager can be employed in various ways:

(1) The menu manager can be called by one program for the purpose of running other programs. For example, an accounting system may have a set of programs used for entering data where each program is used to enter a different type of data; when using the accounting system and desiring to enter data, the accounting system could call the menu manager to control the selection and execution of the various specific data entry programs.

(2) The menu manager can be called by a program for the purpose of obtaining a selection from a user. For example, a printing program may be able to print on a variety of different printers. The printing program can use the menu manager to obtain the user's printer selection. This can be accomplished by calling the menu manager and identifying a menu to be presented for which each of the menu picks corresponds to a printer. In particular, the action associated with each menu pick would be a keyword identifying a printer. After accepting the user's selection, the menu manager would return the keyword associated with the selected menu pick to the printer program.

(3) The menu manager can be used at the "top level". This is really a special case of using the menu manager as described in (1) above. To be used at the top level, the menu manager is called by a simple program whose sole role is to call the menu manager.

Returning keywords and running programs are not separate modes of operation for the menu manager. When the menu manager is called, whether a keyword will be returned or whether further programs will be executed depends upon what actions have been associated with the menu picks and the PF keys in the data bases and what the user actually selects. Selection of one pick on a menu may result in running a program, while selection of a different pick on the same menu may result in the menu manager returning a keyword to the program that called the menu manager.

The menu manager can accept a selection from the user in three ways:
(1) menu pick,
(2) PF key, or
(3) command typed in a command area.

In any particular case not all of these options may be open to the user: the currently displayed menu as defined in the menu data base may not provide a command area; all, some, or none of the PF keys may have actions defined for them; in a very unusual case, a menu may have no menu picks defined.

The overall operation of the menu manager is seen by the user as the following steps:

(1) A screen is displayed to the user. The display will typically include a menu title, a command area, and a list of the menu pick titles (optionally also the identifier for the action associated with each pick).
(2) The user can move the cursor among the menu picks and can move the cursor to the command area (if one is present) in which the user can type the text comprising a command.
(3) The user either presses a key indicating a selection has been made (typically a key labeled RETURN or EXECUTE) or presses a PF key.
(4) If the user pressed a PF key, then the action bound to that key is the user's selection; if the cursor is in the command area, then the command the user has typed is the user's selection; if the cursor is in a location on the screen corresponding to a menu pick, then the action defined for that menu pick is the user's selection. If the cursor is not in one of these areas or the PF key pressed does not have a defined action, then an error message is displayed and the above steps are repeated until a selection is successfully identified.

The user's selection, however identified (e.g. by PF key, menu pick, or typed command), is symbolized by an action identifier. The action identifiers are character strings and each explicitly indicates (by the use of special characters such as parentheses) which of the four possible types of action it indicates:

| | | |
|---|---|---|
| (1) program | FOO | |
| (2) menu | (FOO) | (characterized by parentheses) |
| (3) internal function | <FOO> | (characterized by angle brackets) |
| (4) keyword | 'FOO' | (characterized by single quotes) |

MENU PATH

As indicated above, one of the types of action that may be taken in response to a user's selection from a menu is the presentation of a second menu. From the second menu the user may, in many cases be able to select a menu pick whose action is a third menu.

It is becoming increasingly common for systems to have networks of very large numbers of menus. A user of such a complex system can spend quite a bit of time navigating through the network of menus. Such networks are often organized in tree-like arrangements: a user will typically proceed down one branch to perform one type of operation, and then back up that branch to where it joins a second branch, and proceed down the second branch to perform a different type of operation.

A user's current "menu path" is the sequence of menus from some initial menu to the current menu. When the user makes a menu selection whose action is the presentation of another menu, the path gets longer. When the user backs up along the path, the path gets shorter.

The menu manager provides four internal functions that can be used to back up (in order of increasing degree of back up):

<EXIT> shortens the menu path by one and results in presentation to the user of the immediately previous menu;

<RETURN> displays a list of previous menus, the user selects one from the list, the selected menu is displayed, and the menu path is shortened to the selected menu;

<START> displays the very first menu in the path and eliminates all other menus from the path; and <QUIT> the menu manager returns to the program that called it with no menu being displayed.

These internal menu manager functions may be bound to PF keys or menu picks, or they may be entered directly as commands.

MENU LIST

Figure 2:
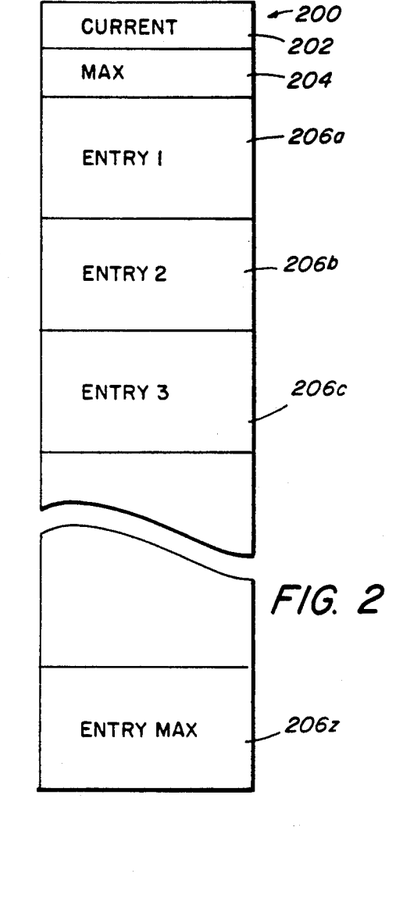
FIG. 2 shows the overall structure of a menu list used by the illustrative menu management system to record information about previously executed menus.

FIG. 2 illustrates the overall structure of a menu list 200, which the menu manager uses to store information about the user's menu path. Heading the list 200 is an element 202 indicating how many menu entries are currently active in the list and an element 204 indicating the maximum number of menus that can be represented in the list 200. Following the two heading elements 202 and 204 is a series of entries 206a through 206z. The list 200 is used as a stack, with the element 202 pointing the "top of the stack", which is the current menu.

Each of the entries 206a–206z can be used to represent one menu in the menu path. The first menu in the path is represented by the first entry 206a. Succeeding menus (to the extent they exist, which will depend on the current length of the path) are represented by entries 206b, 206c and so forth. If the number of menus in the path is the maximum number that can be represented by the list 200, then the last menu in the path would be represented by entry 206z.

Figure 3:
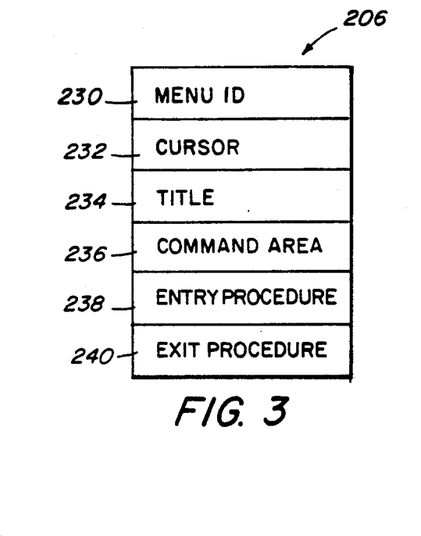
FIG. 3 shows greater detail of the individual entries in the menu list shown in FIG. 2.

FIG. 3 shows a representative entry 206 which illustrates the structure of each of the entries 206a–206z in the menu list 200. The entry 206 includes elements 230, 232, 234, 236, 238, and 240.

The element 230 stores the menu identifier of the menu represented by the entry 206. The element 232 stores the location of the cursor on the display the last time the menu represented by the entry 206 was displayed; this makes it possible when the user backs up to that menu to restore the cursor to the same place it was the last time the user saw that menu. The element 234 stores the title of the menu; this is used in the list displayed to the user in response to the RETURN command (as will be further explained below).

The element 236 is used to store the contents of the command area as it appeared the last time the menu was displayed. As described above, the command area can be filled in by the user in order to select an action that may not be available as a menu pick. The element 236 permits information the user had previously entered in the command area to again be displayed if the user backs up to that menu.

The element 238 is a flag indicating whether the menu's entry procedure has been executed. The element 240 is a flag indicating whether an exit procedure is defined for the menu.

MENU MANAGER OPERATION

Figure 4:
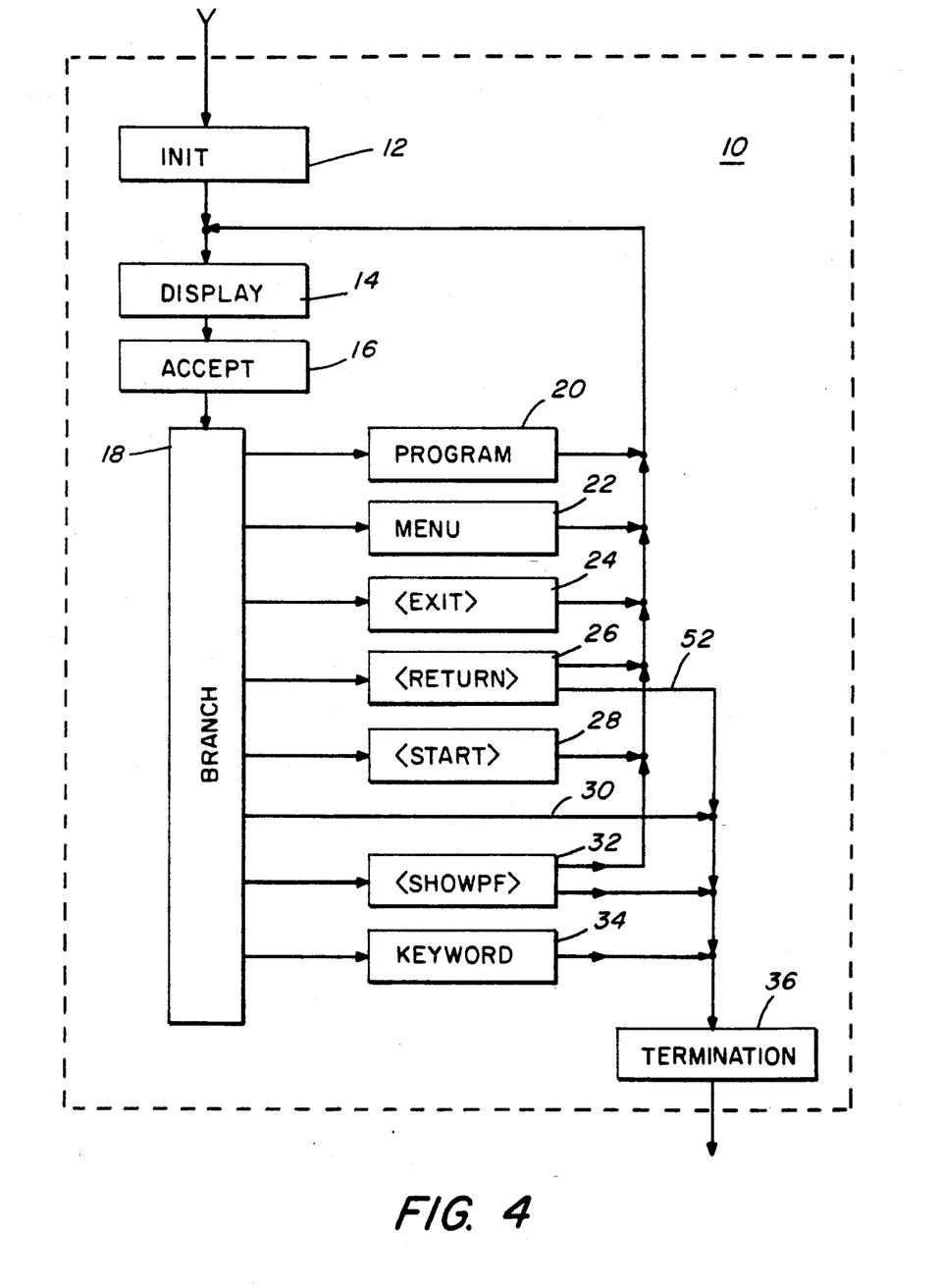
FIG. 4 illustrates the flow of control among components of the menu manager module of the menu management system.

The major components of the illustrative menu manager 10 are shown in FIG. 4.

When the menu manager 10 starts, various initialization operations 12 are performed, including the following. The file-level security information is checked to verify that the user's security classes allow access to that menu data base.

If a file-level entry procedure is defined in the menu data base file, then the procedure is performed. The menu list 200 is initialized: the first entry 206a is cleared and its menu identifier element 230 is set to be the menu identifier for the starting menu (as defined by the menu data base or optionally by the program that called the manager); the element 202 of the menu list 200 is set to indicate that the list 200 contains a single active entry.

Then the menu manager 10 begins its main processing loop, which consists of components 14, 16, 18, 20, 22, 24, 26, 28, and 32:

(1) the current menu is displayed 14;
(2) a user selection is accepted 16;
(3) based on the user's selection, a branch is made 18;
(4) the branch is to the one of the several components 20, 22, 24, 26, 28, 32, 34 and 36, that is suitable for taking the action that is indicated by the user's selection; and
(5) the main processing loop is repeated, beginning with display 14 of the current menu (unless the selected action has resulted in termination of the menu manager processing, which is indicated in FIG. 4 by termination component 36).

The display component 14 uses the menu identifier found in the element 230 of the current entry (determined by the value of element 102) in the menu list 200 as a key into the menu data base 100. From the information thereby located in the menu data base 100, the display of the current menu is built. The pick-level security information is checked, and only those menu picks to which the user is allowed access are displayed.

The component 16 accepts a selection from the user. As described above, the selection may be indicated by pressing a PF key, pointing to a menu pick, or typing a command. However the selection is indicated, it is one of the four above-described types of action.

For program-type actions, menu-type actions, and keyword-type actions component 18 directs processing to components 20, 22, and 34, respectively. For internal-function-type actions, processing is directed to a component designed for processing the particular internal function.

When the selected action is a name of a program, branch mechanism 18 causes processing to proceed with the component 20, which calls the named program. When the named program completes its processing, the component 20 causes processing to proceed with the display 14 of the current menu.

When the selected action is a menu identifier, the branch mechanism 18 causes processing to proceed with the component 22. The component 22 refers to the menu data base (in particular to the menu-level security information) to verify that the user has the security permission to access the identified menu. The component 22 then stores the cursor location and the value of the command area in the elements 232 and 236 respectively of the current entry in the menu list 200, increments the element 202 of the menu list 200 (making the entry following the current entry now the current entry), and stores the selected menu identifier in element 230 of the newly current entry in the menu list. If a menu-level entry procedure is defined for the newly current menu, then it is performed. When the entry procedure has been performed, the flag element 238 is set to indicate that the procedure has been performed. If the menu data base indicates that an exit procedure is defined for the newly current menu, then the flag element 240 is set to indicate that an exit procedure is defined; when backing up and performing exit procedures, this avoids the need to refer to the menu data base for those menus for which no exit procedure is defined. Processing then proceeds with component 14, which displays the newly selected menu.

When the selected action is a keyword, processing is directed to the component 34. The value of the keyword is saved for use by the program that called the menu manager. Processing then proceeds with the termination component 36, which ultimately returns control to the calling program.

Modules 24, 26, 28, 36, and 32 handle the processing of the internal menu manager functions <EXIT>, <RETURN>, <START>, <QUIT>, and <SHOWPF>, respectively. The first four of these functions provide ways that a user can back up along the user's menu path. The fifth function displays to the user the current bindings for the PF keys. Additional internal functions could also be provided; they would be given unique names and their components would be added to the main processing loop in the same fashion as the component 32.

The <EXIT> component 24 implements the internal function that backs up one menu. The component 24 calls the exit procedure defined for the current menu (if any is defined), decrements the element 202 of the menu list 200 (i.e., popping the "top" menu off the stack), and passes control to the display component 14.

Figure 5:
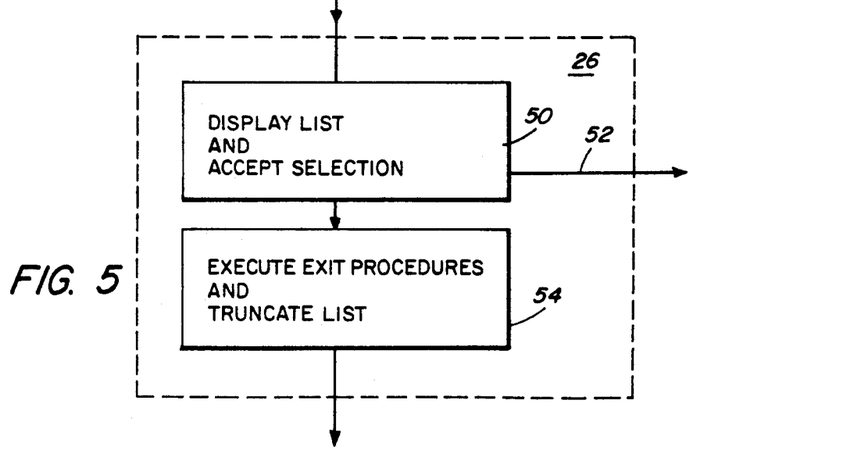
FIG. 5 illustrates the flow of control among components of the menu return processor that is shown in FIG. 4 as a component of the menu manager.

FIG. 5 illustrates the major subcomponents of the component 26 that does the processing to implement the <RETURN> function. A subcomponent 50 displays a list of menus from which the user selects. Then operations are performed by subcomponent 54 to back up the menu path to the selected menu.

The display of menu titles is prepared by extracting the menu titles from the elements 234 of the menu list 200. Optionally (as determined by the basic options 102 of the menu data base 100), the menu identifiers (stored in the elements 230 of the menu list 200) may be displayed along with the menu titles. The menu identifier can be typed in a command area to direct the menu manager to go directly to that menu; displaying the menu identifier helps the user become familiar with the names of the commands.

Selection of one of the listed menus is accepted from the user by the user placing the cursor at the title of the desired menu and pressing the return key. If the list of menus is too long to be displayed on the screen in its entirety, then certain keys are arranged to enable the user to page or scroll through the list, so that all entries in the list are accessible. If, instead of selecting a menu, the user presses the key typically used to terminate programs, then, as is indicated by the line 52, control is passed to the termination component 36.

When the user has selected a menu from the displayed list, the menu path is truncated so that the selected menu is the last menu in the path, and the exit procedures (if any are defined) are executed for each of the menus that are thereby removed from the list 200. For example, if the selected menu is the fourth menu in the menu list 200 which currently contains six menus, then the truncation is accomplished by setting the element 202 of the menu list 200 to a value of four, and exit procedures are performed for the sixth and then the fifth menus.

The <START> function returns the user to the first menu in the menu path. To implement this function, the component 28 sets the element 202 of the menu list 200 to a value of one, and performs the exit procedures defined for all menus in the list except for the first.

The <QUIT> function terminates menu manager processing and returns to the program that called the menu manager. This is accomplished by the termination component 36. The branch corresponding to the <QUIT> function is indicated in FIG. 4 by a line 30. The termination component performs any exit procedures which are defined for the menus listed in the menu list 200 (from the current menu back through the first menu). If the menu data base file defines a file-level exit procedure, it is performed. Finally, control is passed from the menu manager back to the program which called the menu manager.

SOME VARIATIONS

Numerous variations on the above-described embodiment are possible. Some exemplary variations follow.

A menu title need not be displayed as part of the menu. The menu title is merely something by which the user can identify a menu. It is useful to display the menu title as part of the menu because this helps the user become familiar with the titles and thus makes it easier for the user to identify the menus when the menu list is displayed.

A menu path is an example of one way of defining a list of menus which adapts to the activities of each user. Alternative ways to define a list of menus which is customized to the activities of the user include: the most recent N menus (irrespective of "forward" or "backward" movement through the menus, and not remembering more than N menus at one time); the menus visited most frequently; the past "major" menus (like above-described path, but eliminating the less important menus).

Display need not be a visual display. For example, in a system with voice response capabilities, menus might be present aurally; this would be particularly useful when the user is interacting through a telephone, which has no visual display.

The foregoing description has been limited to a specific embodiment of the invention. Additional advantages and modifications will be apparent to those skilled in the art. The invention is, therefore, not limited to the specific details, representative apparatus, and illustrative example shown and described in this specification. Rather, it is the object of the appended claims to cover all such variations and modifications as come within the true spirit and scope of the invention.

What is claimed as new and desired to be secured by Letters Patent of the United States is:

1. In a computer system having a database identifying a plurality of screens having user-selectable options identified thereon, such screens being called menus and such user-selectable options being called picks, at least some of the picks identifying menus to be displayed, the system further including a display on which menus can be presented to a user of the system and further including user input means by which the user can specify actions to be taken including causing a menu to be presented on the display, a menu managements method performed by said computer system including the steps of:

(A) responsive to user input means, storing user-identifications of menus that the user has selected, (B) responsive to user input means, presenting on the display a list of said stored user-identifications of menus, (C) accepting by user input means a selection of one of the user-identifications presented on the display, and (D) responsive to said selection, presenting on the display the menu corresponding to the user-identification selected by the user, whereby the user can go directly from one menu to a previously selected menu without needing to back through other previously selected menus.

2. The process of claim 1, wherein the plurality of menus available to be presented to the user are organized such that there is at least one menu that can be presented by a user's selection from more than one other menu, and further including the step of:

responsive to user input means, displaying an immediately previously displayed menu.

3. The process of claim 2 further including the steps of:

responsive to user input means and subsequent to a sequential display of a plurality of menus, displaying the first menu in the sequence.

4. The process of claim 3 further including the steps of:

calling the menu manager by a plurality of different programs, and in response to user input means, terminating execution of the menu manager and returning control to the calling program.

5. In a computer based menu management system including a database identifying a plurality of screens having user-selectable options identified thereon, such screens being called menus and such user-selectable options being called picks, at least some of the picks identifying menus to be displayed; a display on which menus can be presented to a user of the system; and user input means by which the user can specify actions to be taken including, by successive input actions, selecting a series of menus to be presented on the display and thereby defining a menu path, a computer-implemented menu management method included the steps of:

(A) storing an indication of the user's menu path, (B) updating the stored indication of the user's menu path in response to the user's selection of a menu, (C) responsive to a request from the user via the user input means, presenting on the display a list of the menus indicated in the user's menu path, (D) accepting from the user by means of the user input means a selection of one of the menus presented in the displayed menu path, (E) responsive to the menu selection means, truncating the user's menu path by updating the stored indication of the user's menu path to include only the selected menu and those menus previously in the path that precede the selected menu, and (F) responsive to the user's selection of a menu, presenting on the display the menu selected by the user, whereby to user can go from one menu to a previously selected menu without needing to back through previously selected menus.

6. A menu management method claimed in claim 5 further including the step of executing exit procedures for each menu that was in the menu path prior to the truncation that does not remain in the menu path after the truncation.

7. A computer-based menu management system comprising a data base of information about users of the system, including information defining security privilege for users, plurality of menu data bases, each data base defining a plurality of menus and a plurality of menu picks for each menu, and defining menu-level security information and pick-level security information, a display on which menus can be displayed to a user of the system, selection means by which a user of the system can select a menu to be displayed on the display including means for displaying the user-selected menu only if the menu-level security information for that menu and the user security information indicate that the user has the privilege to access the selected menu, and when a menu is displayed, for displaying only those menu picks for which the pick-level security information and the user security information indicate that the user has the privilege of access.

8. The system of claim 7 wherein:

responsive to a selection and display of a menu selected by the user, the system stores an entry for the selected menu in a list of menus selected by and displaced to the user;

responsive to said storing and to a user request, a list of menu titles for the menus in the menu list is displayed on said display; and responsive to a user selection of one of the displayed titles, the menu corresponding to the selected title is displayed.

9. A computer-implemented method in a computer-based menu management system comprising:

a plurality of application programs;

a display on which menus can be presented to a user of the system;

a menu data base that associates menu picks with actions, and a PF key data base that associates programmable function keys with actions, where the actions associated with menu picks and with programmable function keys include call an application program, return a keyword to a calling program, and display a menu;

a menu manager that can be called by any of a plurality of the application programs, the method including the steps of:

(1) accepting user selections and initiating actions in response thereto, where a user can indicate a selection by means of a menu pick in which case the action associated in the menu data base with the menu pick is initiated, where a user can indicate a selection by means of a programmable function key in which case the action associated in the PF key data base with the programmable function key is initiated, and where a user can indicate a selection by means of a typed command in which case the command typed by the user will be initiated, (2) responsive to a user selection to call a program, calling an application program, (3) responsive to a user selection to return a keyword, returning a keyword to a program that called the menu manager, and (4) responsive to a user selection to display a menu, displaying a menu from the menu data base on said display, wherein said displaying function includes:

responsive to a selection of a menu by the user, storing an entry for the selected menu in a list of menus, responsive to said means for storing and a user request, displaying a list of menu titles for the menus in the menu list, and accepting a user selection of one of the displayed titles and displaying the menu corresponding to the selected title.

* * * * *